US008831537B2

(12) United States Patent
Fratti

(10) Patent No.: US 8,831,537 B2
(45) Date of Patent: Sep. 9, 2014

(54) TRANSITORY TOUCHSCREEN ANTENNA STRUCTURE

(75) Inventor: Roger A. Fratti, Mohnton, PA (US)

(73) Assignee: LSI Corporation, San Jose, CA (US)

( * ) Notice: Subject to any disclaimer, the term of this patent is extended or adjusted under 35 U.S.C. 154(b) by 226 days.

(21) Appl. No.: 13/572,929

(22) Filed: Aug. 13, 2012

(65) Prior Publication Data

US 2014/0045424 A1 Feb. 13, 2014

(51) Int. Cl.
*H04B 1/46* (2006.01)

(52) U.S. Cl.
USPC ........ 455/82; 455/269; 343/907; 343/700 MS

(58) Field of Classification Search
CPC ............... H04B 1/46; H04B 7/00; H01Q 1/38
USPC ......... 455/82, 129, 269, 270, 277.1; 343/818, 343/907, 700 MS
See application file for complete search history.

(56) References Cited

U.S. PATENT DOCUMENTS

| | | | | |
|---|---|---|---|---|
| 6,268,832 | B1 | 7/2001 | Twort et al. | 343/713 |
| 7,233,296 | B2 | 6/2007 | Song et al. | 343/713 |
| 7,410,825 | B2 | 8/2008 | Majumdar et al. | 438/106 |
| 7,423,596 | B2 | 9/2008 | Maniwa et al. | 343/700 |
| 7,847,753 | B2 | 12/2010 | Ishibashi et al. | 343/897 |
| 8,060,029 | B2 * | 11/2011 | Rofougaran | 455/82 |
| 8,213,757 | B2 | 7/2012 | Harrysson et al. | 385/120 |
| 2010/0265189 | A1 | 10/2010 | Rofougaran | 345/173 |
| 2010/0297952 | A1 | 11/2010 | Rofougaran | 455/73 |
| 2011/0037658 | A1 | 2/2011 | Park | 343/700 |
| 2012/0026133 | A1 | 2/2012 | Rofougaran | 345/174 |
| 2012/0062487 | A1 | 3/2012 | Lee et al. | 345/173 |

* cited by examiner

*Primary Examiner* — Blane J Jackson
(74) *Attorney, Agent, or Firm* — Christopher P. Maiorana, PC

(57) ABSTRACT

An apparatus comprising a first substrate, a second substrate, and one or more embedded devices. A lower surface of the first substrate generally has disposed thereon a plurality of first lines comprising a thin-film conductive material. An upper surface of the second substrate generally has disposed thereon a plurality of second lines comprising the thin-film conductive material. The plurality of second lines is generally arranged orthogonally to the plurality of first lines. The lower surface of first substrate generally faces the upper surface of the second substrate and the substrates are generally separated by a predefined distance. The one or more embedded devices are generally coupled between one or more of the first lines and one or more of the second lines. The embedded devices are generally configured to temporarily electrically connect the respective lines to form a radiating structure during an RF operation.

19 Claims, 6 Drawing Sheets

TRANSITORY TOUCHSCREEN ANTENNA STRUCTURE

FIELD OF THE INVENTION

The invention relates to mobile communications generally and, more particularly, to a method and/or apparatus for implementing a transitory touchscreen antenna structure.

BACKGROUND OF THE INVENTION

Resistive touchscreens and touchscreen overlays are used to provide touch-sensitive computer displays. Conventional resistive touchscreens and touchscreen overlays are composed of two flexible sheets coated with a resistive material such as indium tin oxide (ITO) and separated by an air gap or microdots. Conventional resistive touchscreens typically have high resolution (e.g., 4096×4096 DPI or higher), providing accurate touch control. There are two different types of resistive touchscreens, analogue and matrix (or digital).

The analogue type of resistive touchscreens consists of transparent electrodes without any patterning facing each other. During operation of a four-wire analogue touchscreen, a uniform, unidirectional voltage gradient is applied to the first sheet. When the two sheets are pressed together, the second sheet measures the voltage as distance along the first sheet, providing the X coordinate. When this contact coordinate has been acquired, the voltage gradient is applied to the second sheet to ascertain the Y coordinate. These operations occur within a few milliseconds, registering the exact touch location as contact is made.

The matrix (or digital) type of resistive touchscreen has two substrates such as glass or plastic facing each other. Each substrate is coated with a resistive material such as indium tin oxide (ITO). The ITO coating on each substrate is patterned as striped electrodes. The striped electrodes are patterned as horizontal and vertical lines that, when pushed together, register the precise location of the touch.

Resistive touchscreens and overlays are commonly used in portable devices such as cellular telephones, tablets, etc. because they are inexpensive and generally available. Portable devices generally include support for wireless communication. Wireless communication generally is provided using radio frequency (RF) links. Radio frequency (RF) communication support requires some sort of antenna (or radiating structure) be included in the portable devices, which increases the number of components and the cost.

It would be desirable to implement a transitory touchscreen antenna structure.

SUMMARY OF THE INVENTION

The invention concerns an apparatus comprising a first substrate, a second substrate, and one or more embedded devices. A lower surface of the first substrate generally has disposed thereon a plurality of first lines comprising thin-film conductive material. An upper surface of the second substrate generally has disposed thereon a plurality of second lines comprising thin-film conductive material. The plurality of second lines is generally arranged orthogonally to the plurality of first lines. The lower surface of first substrate generally faces the upper surface of the second substrate and the substrates are generally separated by a predefined distance. The one or more embedded devices are generally coupled between one or more of the first lines and one or more of the second lines. The embedded devices are generally configured to temporarily electrically connect the respective lines to form a radiating structure during an RF operation.

The objects, features and advantages of the invention include providing a transitory touchscreen antenna structure that may (i) be implemented using embedded diodes in a digital resistive touchscreen, (ii) allow an antenna (or radiating structure) that is assembled during periods of RF operations and otherwise dis-assembled, and/or (iii) form a radiating element (or structure) from conductive lines on two indium tin oxide layers of a matrix resistive touchscreen.

BRIEF DESCRIPTION OF THE DRAWINGS

These and other objects, features and advantages of the invention will be apparent from the following detailed description and the appended claims and drawings in which:

DETAILED DESCRIPTION OF THE PREFERRED EMBODIMENTS

Figure 1:
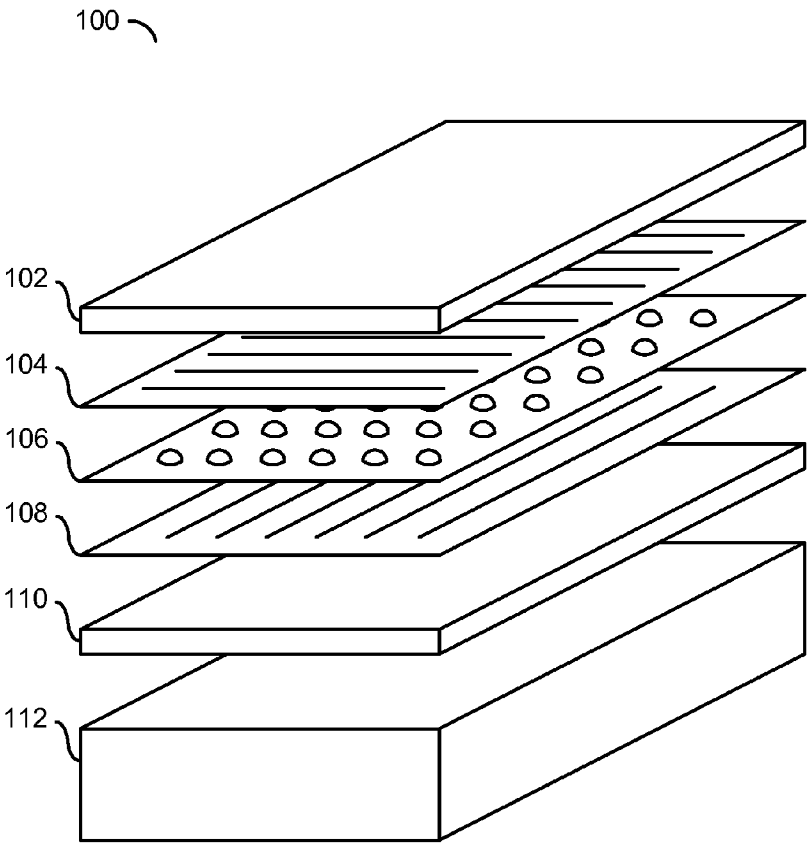
FIG. 1 is a diagram illustrating layers of a matrix resistive touchscreen in accordance with an embodiment of the invention.

Referring to FIG. 1, a diagram is shown illustrating various layers of a touchscreen 100 in accordance with an embodiment of the invention. In one example, the touchscreen 100 may include a first substrate 102, a first conductive layer 104, an insulating (or separating) layer 106, a second conductive layer 108, a second substrate 110, and a display layer 112. The first substrate 102 may comprise a flexible optical grade plastic (e.g., polyethylene terephthalate (PET), polyester, etc.). The first conductive layer 104 may comprise a first circuit layer having a transparent thin-film conducting material (e.g., indium tin oxide (ITO), indium zinc oxide (IZO), etc.). The transparent thin-film conducting material may be deposited (e.g., sputtered, etc.) on an underside (lower surface) of the first substrate 102. The transparent thin-film conducting material of the first conductive layer 104 may be patterned (e.g., etched) to form a plurality of conductive lines (or electrodes) that may be aligned with a first (e.g., horizontal) axis.

The insulating (or separating) layer 106 may comprise, for example, an air gap, an array of spacer (separator) dots, an array of dielectric dots, or some other way of maintaining a predefined distance between the lower surface of the first substrate 102 and an upper surface of the second substrate 110 while no pressure is being applied to the touchscreen. The predefined distance is generally selected to prevent unwanted and/or accidental contacts between the first conductive layer 104 and the second conductive layer 108 deposited on the upper surface of the second substrate 110. In one example, the separation provided by the insulating layer 106 may range from 0.002 inch to 0.010 inch. The separating layer 106 may include a number of openings (or spaces) through which the layers 104 and 108 may make contact with each other when pressure (e.g., from a finger, stylus, etc.) is applied. A number of the openings may also be configured to allow semiconductor devices (e.g., diodes, etc.) embedded in one or both of the layers 104 and 108, or placed between the layers 104 and 108 during assembly, to make contact with the opposing layers 108 and 104, respectively.

The layer 108 may comprise a second circuit layer having a transparent thin-film conducting material (e.g., indium tin oxide (ITO), indium zinc oxide (IZO), etc.). The transparent thin-film conducting material may be deposited (e.g., sputtered, etc.) on the upper surface (or upperside) of the second substrate 110. The transparent thin-film conducting material of the layer 108 may be patterned (e.g., etched) to form a plurality of conductive lines (electrodes) that may be aligned with a second (e.g., vertical) axis. The conductive lines of the layer 104 are generally orthogonal to the conductive lines of the layer 108 (e.g., rows and columns). The second substrate 110 generally comprises a stable support (backing) material (e.g., glass, acrylic, etc.). The layer 112 generally implements a display (e.g., LCD, LED, etc.). The layers 102-110 are generally held together and sealed with a gasket adhesive, which isolates the touchscreen from the external environment.

One or both of the conductive layers 104 and 108 may include embedded devices (e.g., diodes) configured to temporarily electrically connect the lines on the layers 104 and 108 to form a radiating (antenna) structure during an RF operation (e.g., transmitting, receiving, performing near field communication, etc.) of a device utilizing the touchscreen. For example, beam lead or chip diodes may be placed in-between the layers 104 and 108. In one example, embedding the diodes in the orthogonal planes of the conductive layers 104 and 108 may be done similarly to techniques used in microwave technology for embedding diodes in strip line assemblies. In one example, the diodes may be about 0.005 inch thick. In one example, interconnect technology to the touchscreen layers may be implemented using conventional techniques (e.g., bump contacts).

The conducting layers 104 and 108 are generally sufficient for forming a radiating structure. In general, the skin effect at 2.5 and 5.2 GHz keeps most of the electrons in the outer surface, so the fact that the conducting layers 104 and 108 comprise a thin wire is generally not an issue. Although the radiation resistance and dissipation resistance may be higher than for a very thick copper line, the higher radiation resistance and dissipation resistance may be compensated for with a transceiver matching circuit. In comparison, conventional antennas are typically electrically small and have less than desirable directivity (e.g., 1.2 to 1.8 dBi).

Figure 2:
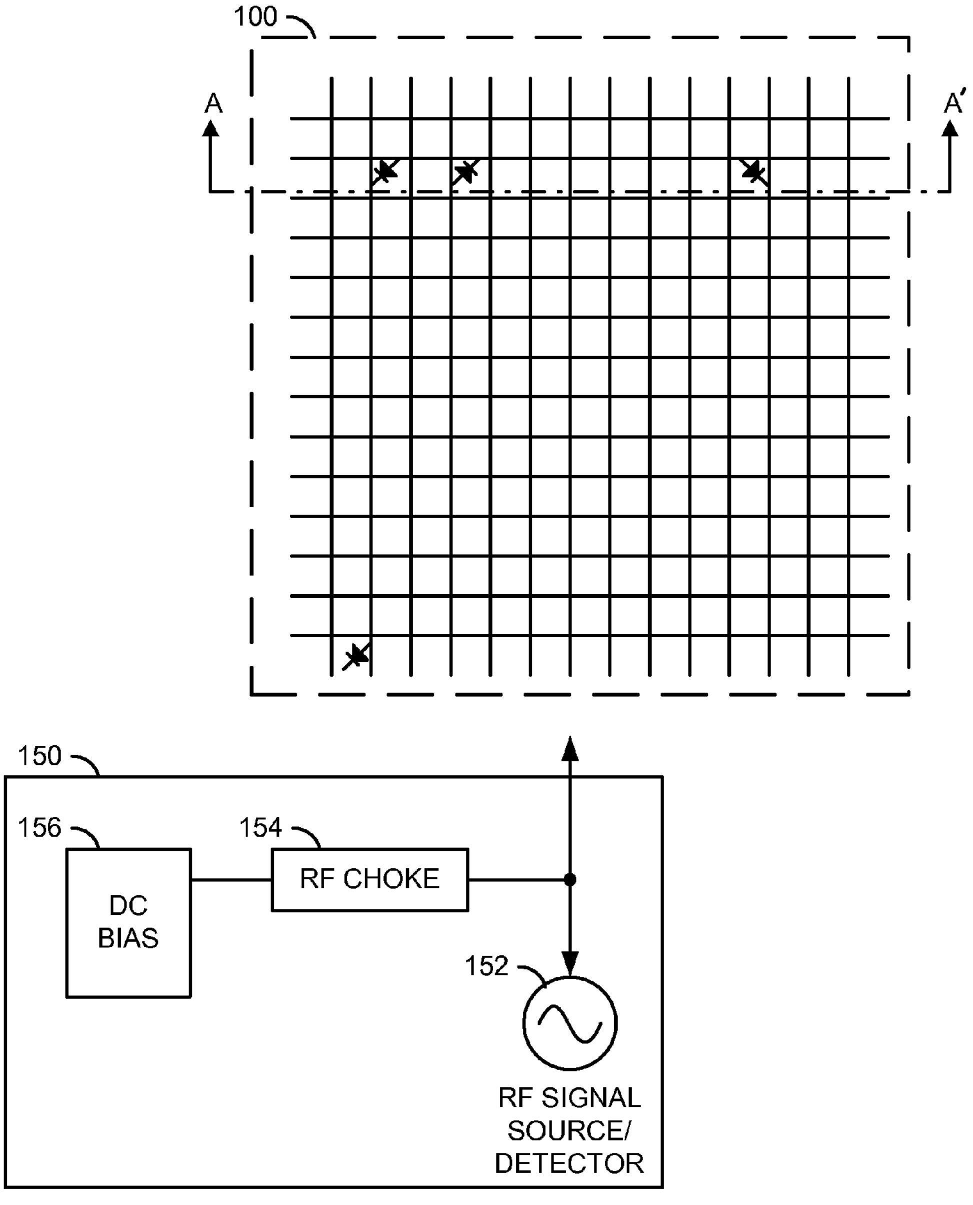
FIG. 2 is a diagram illustrating an example placement of diodes in accordance with an embodiment of the invention.

Referring to FIG. 2, a diagram is shown illustrating an example placement of a number of devices (e.g., diodes) in accordance with an embodiment of the invention. In one example, a number of diodes may be embedded in the touchscreen 100. During a touchscreen operation, a controller (not shown) may poll, strobe, and/or multiplex the row and column electrodes to sense when and where the touchscreen 100 is touched. During an RF operation, the controller may be idled, predetermined lines of the touchscreen 100 may be temporarily electrically coupled, and an RF module 150 may be coupled to the touchscreen 100. The RF module 150 may comprise a RF transmitter (or RF source), an RF receiver (or RF detector), and/or an RF transceiver. For example, the RF module 150 may be configured to utilize elements of the thin-film conducting layers 104 and 108 coupled by the diodes to form an antenna (radiating structure) for broadcasting (transmitting), receiving, and/or performing near field communication (NFC) using a radio frequency (RF) signal.

In one example, the RF module 150 may comprise a module 152, a module 154, and a module 156. The module 152 may implement an RF signal source (e.g., a transmitter, transceiver, etc.). In another example, the module 152 may implement an RF signal receiver. The module 154 may implement an RF choke. The module 156 may implement a DC bias circuit. In one example, the DC bias circuit 156 may be configured to generate a bias signal that may be coupled to the touchscreen 100 via the RF choke 154 to configure elements of the touchscreen 100 as the radiating structure (e.g., a di-pole antenna, an inverted F antenna, a loop antenna, etc.). For example, the DC bias circuit 156 may generate a signal that forward biases the diodes coupled between the layers 104 and 108, thus electrically connecting the associated conducting lines on the layers 104 and 108 to assemble the desired radiating structure. When the DC bias circuit stops generating the bias signal, the radiating structure is dis-assembled by essentially disconnecting the elements of the radiating structure and the associated conducting lines on the layers 104 and 108 are returned to the touchscreen configuration.

Figure 3:
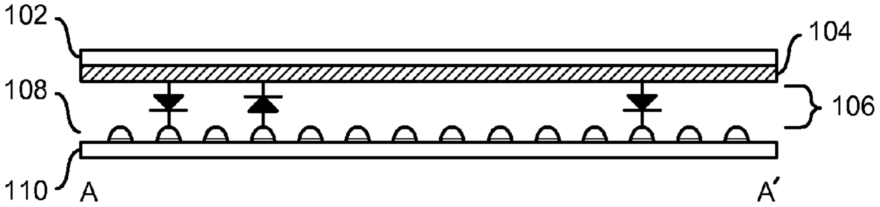
FIG. 3 is a diagram illustrating a cross-section of the matrix resistive touchscreen of FIG. 2 along the line A-A'.

Referring to FIG. 3, a diagram is shown illustrating a cross-section of the touchscreen 100 of FIG. 2 along the line A-A'. In one example, one or both of the conductive layers 104 and 108 may include embedded devices (e.g., diodes) configured to temporarily electrically connect one or more lines on the layer 104 with one or more lines on the layer 108 in order to form a radiating structure during an RF operation of a device utilizing the touchscreen 100. In another example, discrete devices (e.g., beam lead, chip diodes, etc.) may be placed in-between the layers 104 and 108 during assembly of the layers. In one example, the diodes may be implemented with a thickness of about 0.005 inch, which should fit well within the space provided by the insulating layer 106. Because resistive touchscreens typically have high resolution (e.g., 4096×4096 DPI or higher), the addition of the diodes between the layers 104 and 108 will generally have little effect on the operation of the touchscreen 100 in the touchscreen mode. In one example, embedding the diodes in the orthogonal planes of the conductive layers 104 and 108 may be done similarly to techniques used in microwave technology for embedding diodes in strip line assemblies. For example, an amorphous silicon process may be used where the diodes are fabricated on the substrates.

Figure 4:
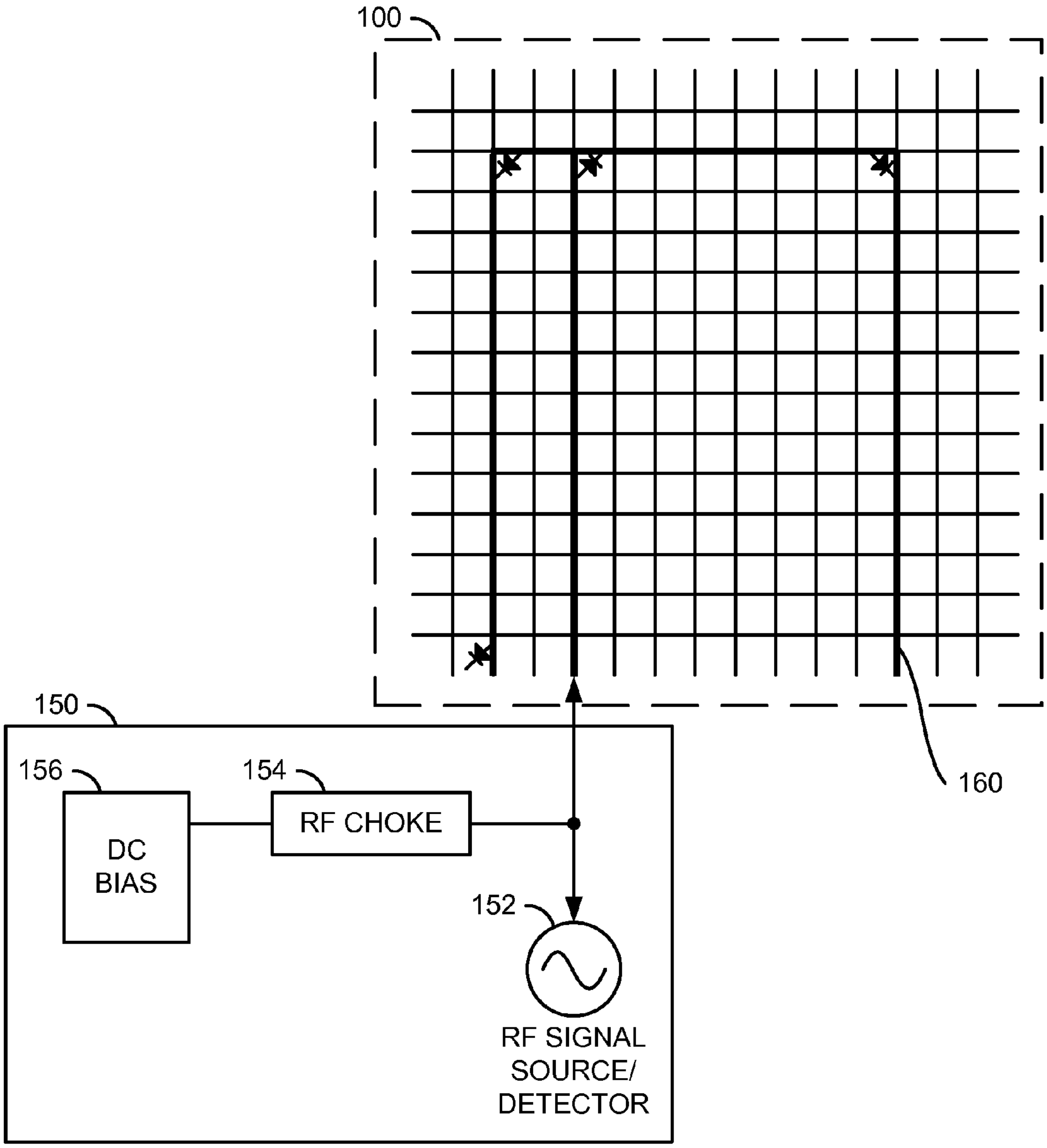
FIG. 4 is a diagram illustrating an example antenna formed when the diodes of FIG. 2 are forward biased.

Referring to FIG. 4, a diagram is shown illustrating an example radiating structure formed when the diodes of FIG. 2 are forward biased in response to the bias signal generated by the DC bias circuit 156. The forward biased diodes generally provide a temporary electrical connection of the lines of the conductive layers 104 and 108 to form a radiating structure 160 that may be appropriate for transmission using WiFi, Bluetooth, ZigBee, near filed communication (NFC), etc. The RF module 150 may be configured to provide the WiFi, Bluetooth, ZigBee, NFC, or other RF capability. In one example, the DC bias circuit 156 may forward bias the diodes just prior to an RF operation (e.g., transmission, reception, etc.), interconnecting the appropriate lines and forming the appropriate antenna (e.g., a di-pole antenna, inverted F antenna, NFC loop antenna, etc.). Upon completion of the RF operation, the radiating structure 160 may be returned to isolated lines as soon as the forward biasing of the diodes is discontinued.

Figure 5:
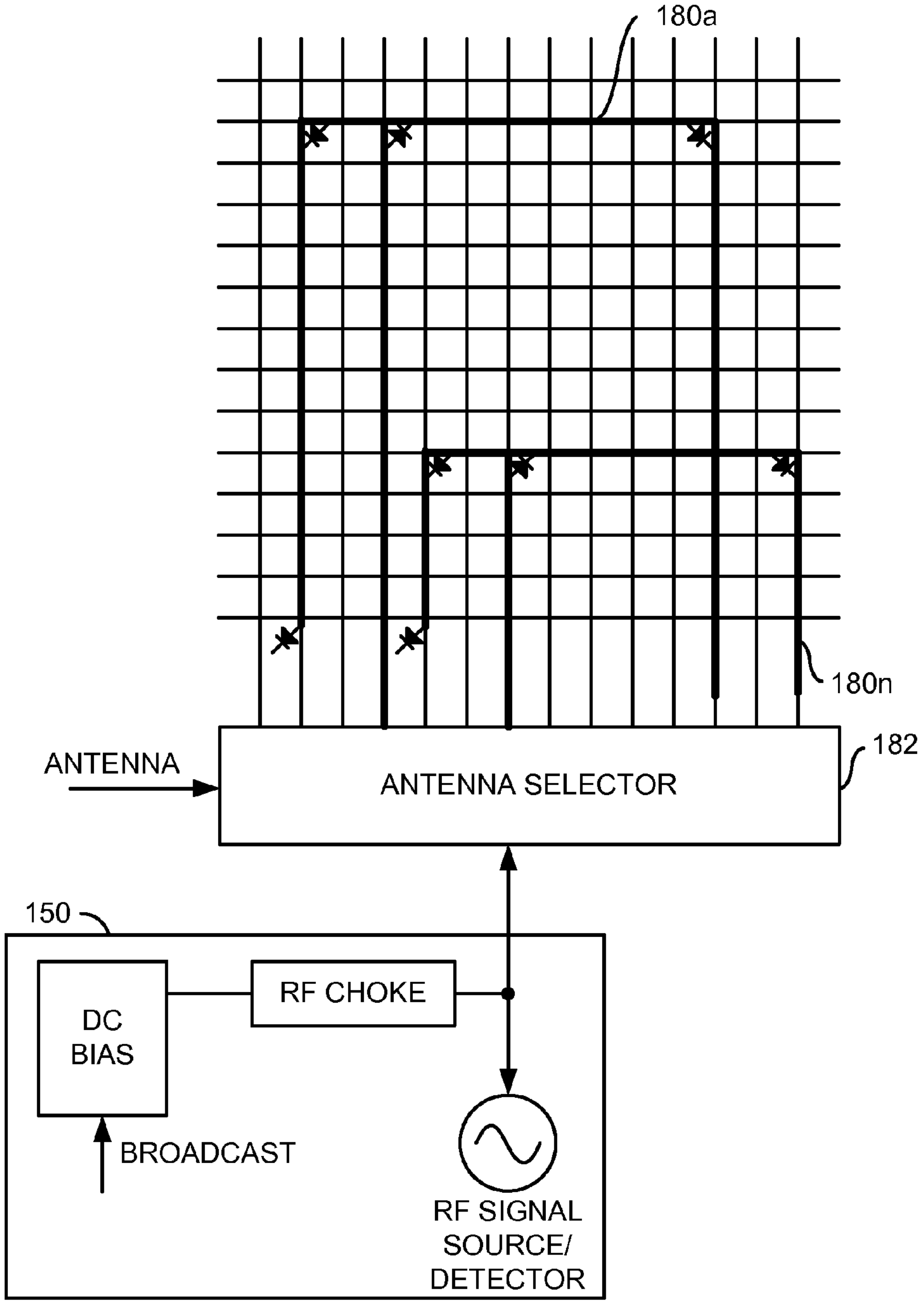
FIG. 5 is a diagram illustrating an example circuit allowing an RF source to be connected to a number of antenna structures.

Referring to FIG. 5, a diagram is shown illustrating an example circuit in accordance with another embodiment of the invention. In one example, the touchscreen may be configured to allow an RF module to be connected to a number of different antenna structures. For example, a number of sets of diodes may be embedded in the conductive layers 104 and 108 to provide a number of different antennae (or radiating structures) 180*a*-180*n*. An antenna selector 182 may be implemented to select the particular radiating structure connected to the RF module 150 at a particular time. In one example, the antenna selector 182 may have a control input that may receive a signal indicating the particular radiating structure to be formed. For example, by connecting the RF module 150 to the input line(s) associated with one of the radiating structures 180*a*-180*n*, the desired antenna configuration may be formed when the DC bias circuit 156 forward biases the diodes associated with the particular one of the radiating structures 180*a*-180*n*.

Figure 6:
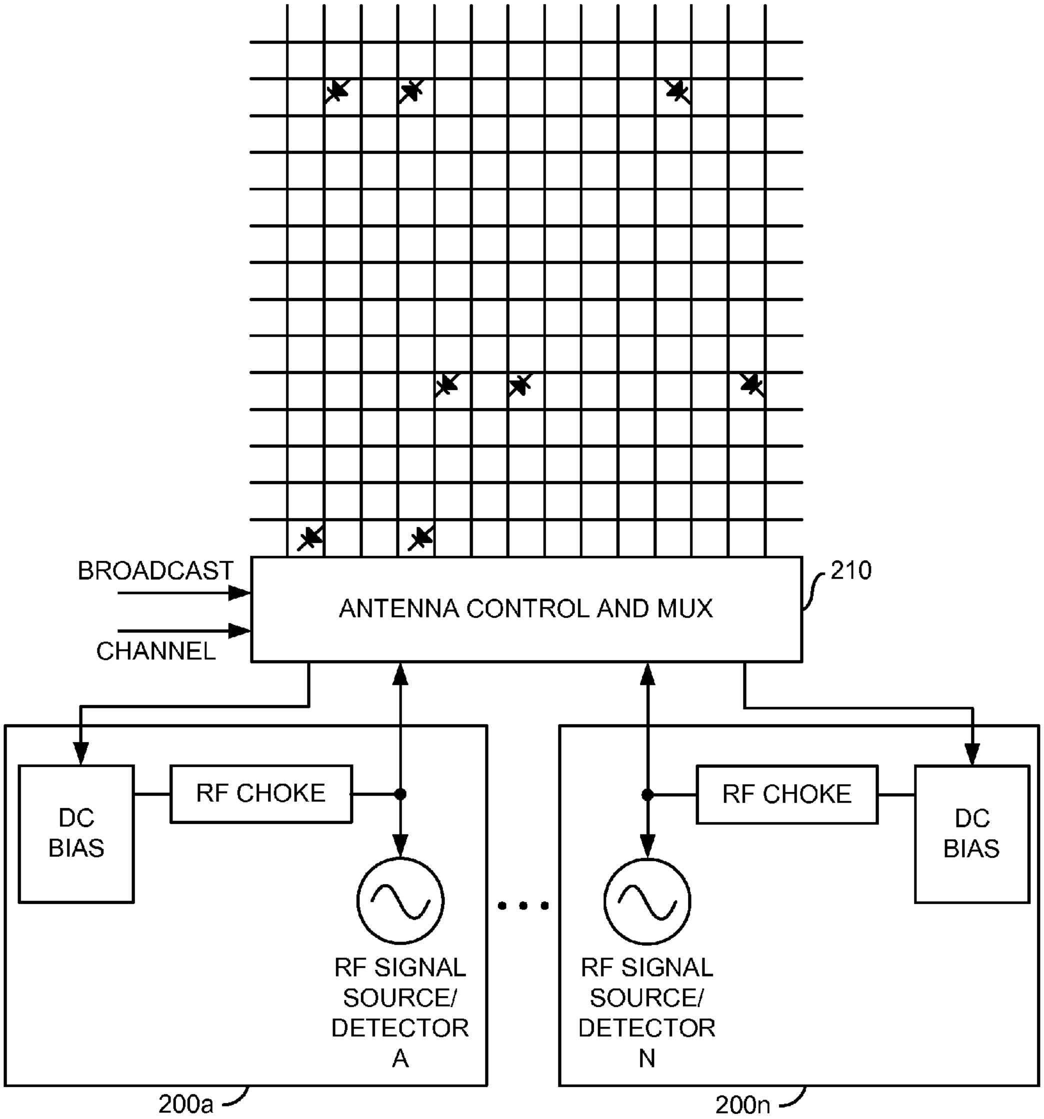
FIG. 6 is a diagram illustrating another example of a circuit allowing connections between multiple RF sources and antenna structures.

Referring to FIG. 6, a diagram is shown illustrating another example of a circuit allowing connections between multiple RF modules and multiple radiating structures. In one example, a number of sets of diodes may be embedded between the layers 104 and 108 to provide a number of different radiating structures. A number of RF modules 200*a*-200*n* may also be implemented. An antenna control and multiplexing module 210 may be configured to couple the touchscreen configured to implement the number of radiating structures with the number of RF modules 200*a*-200*n*. The antenna control and multiplexing module 210 may be configured to select the particular radiating structure and a particular one of the RF modules 200*a*-200*n* to be connected at a particular time. In one example, the antenna control and multiplexing module 210 may have a control input that may receive a signal (e.g., CHANNEL) indicating the particular radiating structure and transmitter. In another example, the antenna control and multiplexing module 210 may have a second control input that may receive a signal (e.g., BROADCAST) indicating when to turn on the DC bias for forward biasing the appropriate diodes. It would be apparent to those of skill in the pertinent art(s) that the functionality described in connection with the signals CHANNEL and BROADCAST may be implemented as a single or multiple signals.

Figure 7:
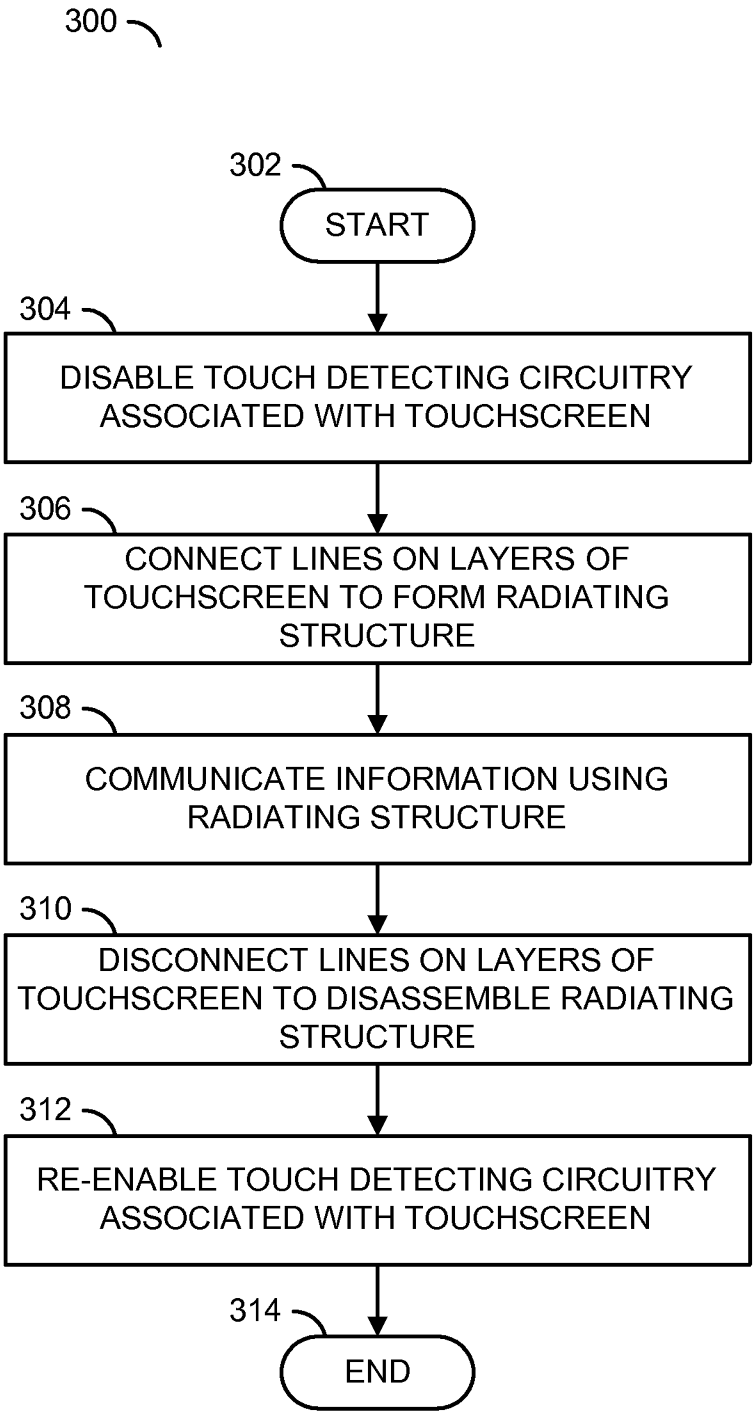
FIG. 7 is a flow diagram illustrating an example broadcast operation in accordance with an embodiment of the invention.

Referring to FIG. 7, a flow diagram is shown illustrating a process 300 in accordance with an embodiment of the invention. In one example, the process (or method) 300 may comprise a step (or state) 302, a step (or state) 304, a step (or state) 306, a step (or state) 308, a step (or state) 310, a step (or state) 312, and a step (or state) 314. The process 300 may start in the step 302 and move to the step 304. In the step 304, the process 300 may disable touch detecting circuitry associated with all or a portion of a matrix resistive touchscreen. In the step 306, the process 300 may temporarily connect lines on conductive layers of the matrix resistive touchscreen to form a radiating structure (e.g., di-pole antenna, inverted F antenna, loop antenna, etc.). In the step 308, the process 300 may use the radiating structure formed in the step 306 to transmit and/or receive information. In the step 310, the process 300 may disconnect the lines in the conductive layers of the touchscreen to disassemble the radiating structure and return the touchscreen to a touch sensitive mode. In the step 312, the process 300 may re-enable the touch detecting circuitry associated with the touchscreen. The process 300 generally ends in the step 314.

Although the examples provide above refer to indium tin oxide (ITO) and/or indium zinc oxide (IZO), it will be apparent to those of ordinary skill in the art that the thin-film conductive (or conducting) material used to form the conductive layers 104 and 108 may include, for example, (i) conductive polymers (e.g., including polypyrrole, polyaniline or polythiophene), (ii) transparent conducting oxides (e.g., including tin doped indium oxide (ITO), fluorine doped zinc oxide (FZO), aluminum doped zinc oxide AlZO, indium doped zinc oxide (IZO), antimony doped tin oxide (SbTO), and fluorine doped tin oxide (FTO)), and (iii) low-resistance metallic material such as molybdenum (Mo), silver (Ag), titanium (Ti), copper (Cu), aluminum (Al), and/or molybdenum/aluminum/molybdenum (Mo/Al/Mo). The terms "may" and "generally" when used herein in conjunction with "is (are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to the preferred embodiments thereof, it will be understood by those skilled in the art that various changes in form and details may be made without departing from the scope of the invention.

The invention claimed is:

1. An apparatus comprising:

a first substrate, wherein a lower surface of said first substrate has disposed thereon a plurality of first lines comprising a thin-film conductive material;

a second substrate, wherein an upper surface of said second substrate has disposed thereon a plurality of second lines comprising the thin-film conductive material, said plurality of second lines arranged orthogonally to the plurality of first lines; and one or more embedded devices coupled between one or more of the first lines and one or more of the second lines, wherein the lower surface of the first substrate faces the upper surface of the second substrates, the first and the second substrates are separated by a predefined distance, and the embedded devices are configured to temporarily electrically connect the respective lines to form a radiating structure during an RF operation.

2. The apparatus according to claim 1, wherein said first substrate comprises a flexible film, said second substrate comprises a rigid material, and said first substrate and said second substrate are separated by an insulating layer.

3. The apparatus according to claim 2, wherein said insulating layer comprises one of an air gap and an array of spacer dots.

4. The apparatus according to claim 1, wherein said embedded devices comprise diodes.

5. The apparatus according to claim 1, wherein said embedded devices configure said one or more first lines and said one or more second lines to form said radiating structure during said RF operation of said apparatus and allow said one or more first lines and said one or more second lines to operate as part of a touchscreen during non-RF operation of said apparatus.

6. The apparatus according to claim 1, further comprising a bias circuit configured to generate a bias signal, wherein said embedded devices are configured to temporarily electrically connect the respective lines in response to the bias signal.

7. The apparatus according to claim 1, further comprising two or more sets of embedded devices, wherein each of said sets of embedded devices defines a different radiating structure.

8. The apparatus according to claim 7, further comprising an antenna selector module configured to select a particular radiating structure in response to a control signal.

9. The apparatus according to claim 7, further comprising:

a plurality of RF modules; and an antenna control and multiplexing module configured to select a particular radiating structure and a particular RF module in response to one or more control signals.

10. The apparatus according to claim 1, wherein the thin-film conductive material comprises at least one of polypyrrole, polyaniline, polythiophene, tin doped indium oxide (ITO), fluorine doped zinc oxide (FZO), aluminum doped zinc oxide AlZO, indium doped zinc oxide (IZO), antimony doped tin oxide (SbTO), and fluorine doped tin oxide (FTO)), molybdenum (Mo), silver (Ag), titanium (Ti), copper (Cu), aluminum (Al), and molybdenum/aluminum/molybdenum (Mo/Al/Mo).

11. The apparatus according to claim 1, wherein the thin-film conductive material comprises at least one of tin doped indium oxide (ITO) and indium doped zinc oxide (IZO).

12. The apparatus according to claim 1, wherein the thin-film conductive materials deposited on said first and said second substrates are the same or different.

13. The apparatus according to claim 1, wherein said apparatus is part of a matrix resistive touchscreen.

14. The apparatus according to claim 1, wherein said apparatus is part of a portable device.

15. The apparatus according to claim 1, wherein said apparatus is part of a portable communication device.

16. The apparatus according to claim 1, wherein said radiating structure comprises a structure selected from the group consisting of a di-pole antenna, an inverted F antenna, and a loop antenna.

17. The apparatus according to claim 1, wherein said RF operation comprises one or more of transmitting an RF signal, receiving an RF signal, and performing near field communication.

18. A method of communicating information using a transitory touchscreen antenna structure comprising the steps of:

disabling touch detecting circuitry associated with a matrix resistive touchscreen;

temporarily connecting lines on conductive layers of the matrix resistive touchscreen to form a radiating structure;

communicating information using the radiating structure;

disconnecting the lines in the conductive layers of the touchscreen to disassemble the radiating structure and return the touchscreen to a touch sensitive mode; and re-enabling the touch detecting circuitry associated with the touchscreen.

19. The method according to claim 18, wherein communicating information using the radiating structure comprises one or more of transmitting an RF signal, receiving an RF signal, and performing near field communication.

* * * * *